(12) United States Patent
Ohuchi et al.

(10) Patent No.: US 8,209,863 B2
(45) Date of Patent: Jul. 3, 2012

(54) METHODS OF MANUFACTURING ROTOR CORE FOR MOTOR-DRIVEN VALVE, ROTOR FEED SCREW AND ROTOR

(75) Inventors: Tomoari Ohuchi, Setagaya-ku (JP); Masaya Satou, Setagaya-ku (JP)

(73) Assignee: Fujikoki Corporation, Tokyo (JP)

( * ) Notice: Subject to any disclaimer, the term of this patent is extended or adjusted under 35 U.S.C. 154(b) by 739 days.

(21) Appl. No.: 12/134,584

(22) Filed: Jun. 6, 2008

(65) Prior Publication Data
US 2009/0300918 A1 Dec. 10, 2009

(51) Int. Cl.
*B21D 51/16* (2006.01)
(52) U.S. Cl. .................................. 29/890.127
(58) Field of Classification Search ............. 29/890.127; 264/478; 249/59, 173
See application file for complete search history.

(56) References Cited

U.S. PATENT DOCUMENTS

2008/0206016 A1* 8/2008 Thompson .................... 411/432
* cited by examiner

*Primary Examiner* — David Bryant
*Assistant Examiner* — Moshe Wilensky
(74) *Attorney, Agent, or Firm* — Stetina Brunda Garred & Brucker; Mark B. Garred (57) ABSTRACT

To improve methods of manufacturing a rotor core, a rotor feed screw, and a rotor for motor-driven valves and reduce manufacturing cost of the motor-driven valves. A method of manufacturing the rotor core comprising the steps of: using an openable/closable die device 23 defining a molding recess 28 for the sleeve 14; forming to the die device 23 a molding recess 24*a* for the valve closing limit stopper 14*a* and a first positioning portion 27*a* positionally corresponding to the molding recess 24*a*; forming to the bushing 11 a second positioning portion 11*c* such that when the second positioning portion 11*c* coincides with the first positioning portion 27*a* a thread-cut leading end 11*b* of the female screw 11*a* and the molding recess 24*a* for the valve closing limit stopper 14*a* are positionally corresponding to each other; mounting the bushing 11 to the die device 23 such that the second positioning portion 11*c* coincides with the first positioning portion 27*a*; and closing the die device 23 and casting molten resin into the molding recess 28 to manufacture the rotor core 19. In the same manner as described above, a rotor feed screw 20 and a rotor 40 can be manufactured.

9 Claims, 8 Drawing Sheets

METHODS OF MANUFACTURING ROTOR CORE FOR MOTOR-DRIVEN VALVE, ROTOR FEED SCREW AND ROTOR

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field of the Invention

The present invention relates to methods of manufacturing a rotor core arranged in the central portion of a motor-driven valve, which is used for controlling flow rate of fluid such as refrigerant for a refrigeration cycle system and is provided with a valve body linearly moving by rotation of a rotor; a rotor feed screw for moving the rotor through engagement with the rotor; and the rotor.

2. Description of the Related Art

Figure 6:
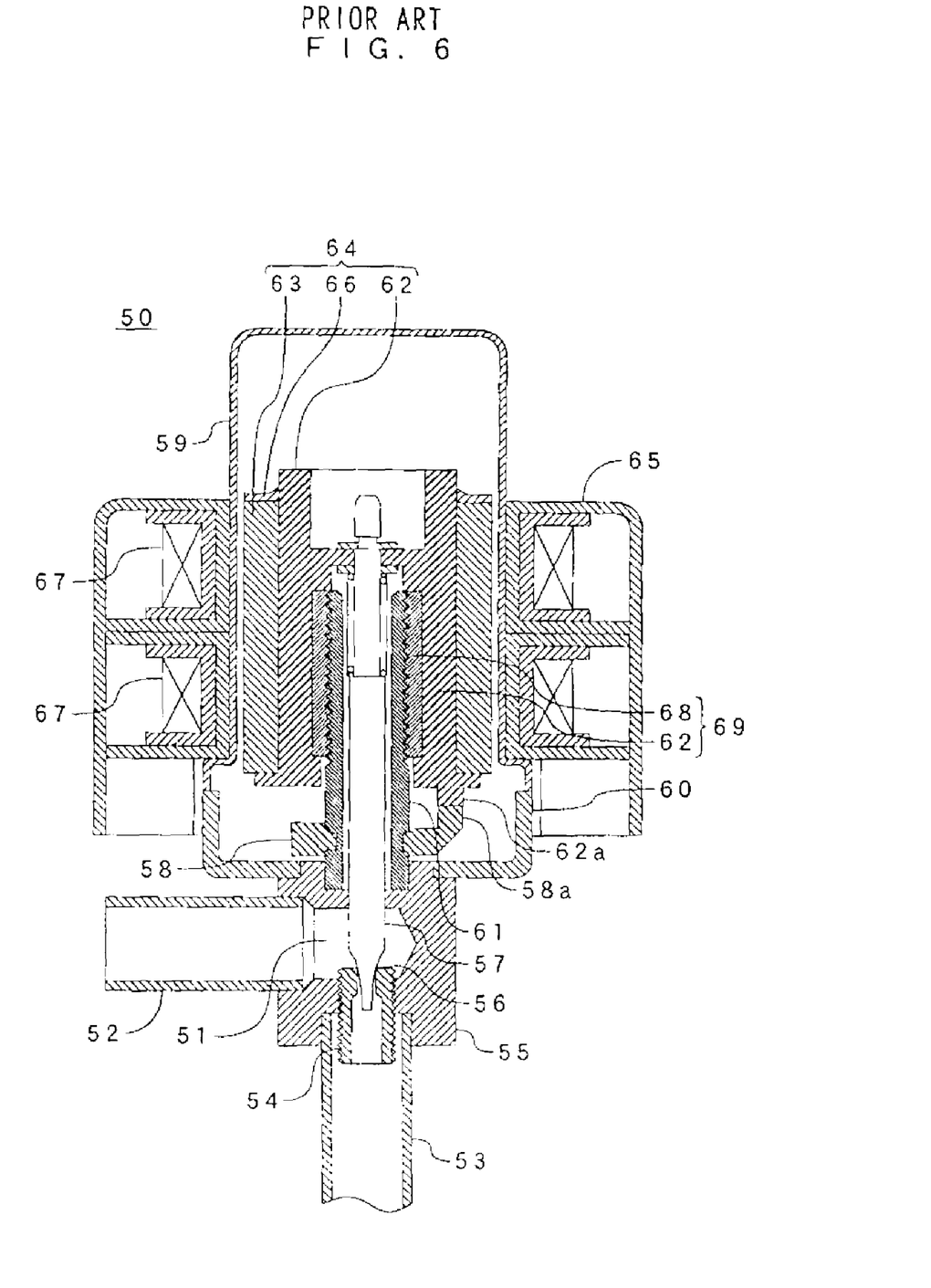
FIG. 6 is an overall cross-sectional view of a conventional motor-driven valve.

One of the motor-driven valves described above is proposed in Japanese Patent 3310042. As shown in FIG. 6, the motor-driven valve 50 comprises: a valve main body 55 having a first passage 52 and a second passage 53 that communicate with a valve chamber 51, and a valve seat 54 at a portion of the second passage 53 that communicates with the valve chamber 51; a rod-shaped needle valve 57 that contacts with and is separated from a valve seat portion 56 of the valve main body 55; a cylindrical sealed case 59; a stator coil 67 disposed outside the sealed case 59; a rotor 64 that rotates in the sealed case 59 through magnetization by feeding current of the stator coil 67 so as to be movable in a valve opening/closing direction and has a cylindrical sleeve 62 and a cylindrical permanent magnet 63 fixed on an outer surface of the sleeve 62 through a stop ring 66; and a male screw pipe 61 allowing the needle valve 57 to act for valve opening/closing operation through screw-feeding action by rotation of the rotor 64, wherein a lower case 60 of the sealed case 59 is fixed through welding to the valve main body 55.

Figure 7A:
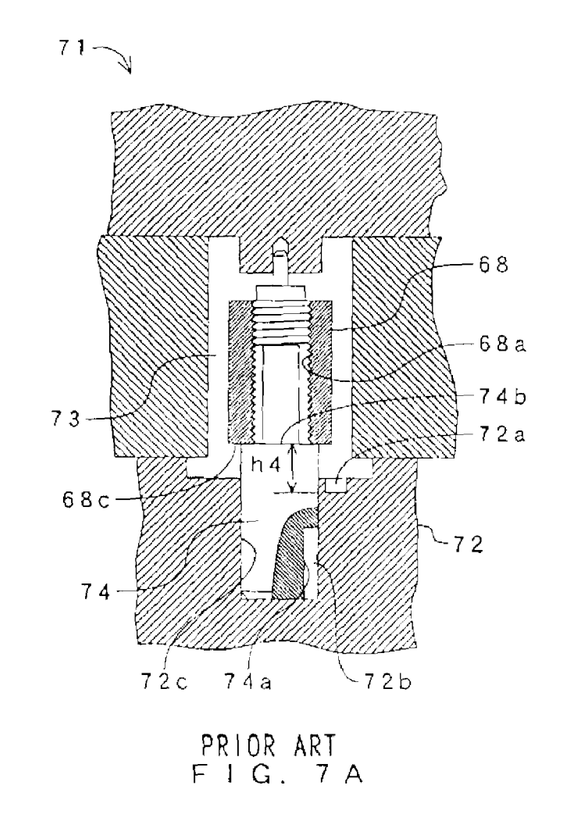
FIG. 7A is a cross-sectional view for explaining the manufacturing method.
Figure 7B:
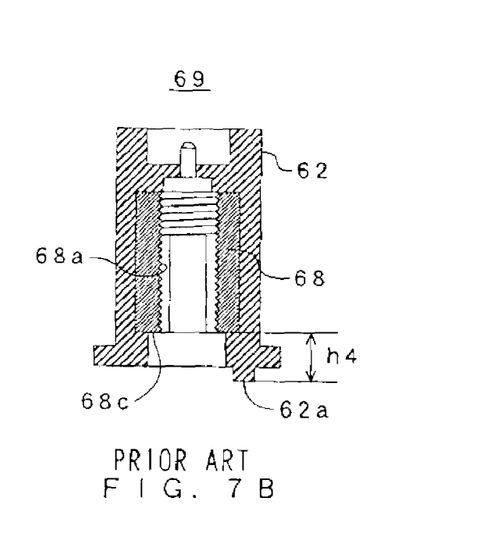
FIG. 7B is a cross-sectional view of the manufactured rotor core.
Figure 8A:
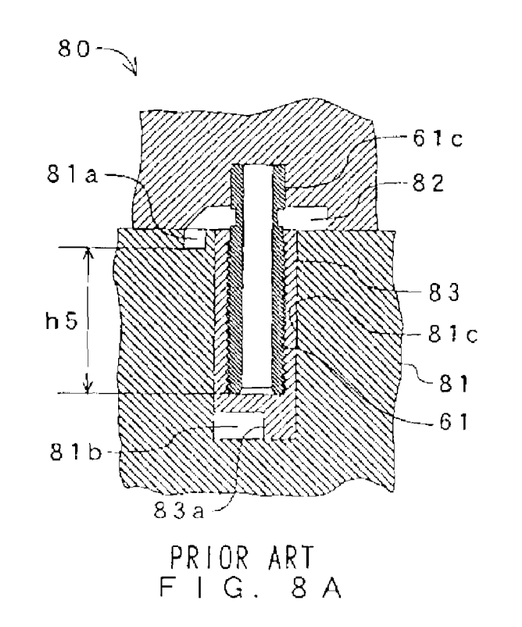
FIG. 8A is a cross-sectional view for explaining the manufacturing method.
Figure 8B:
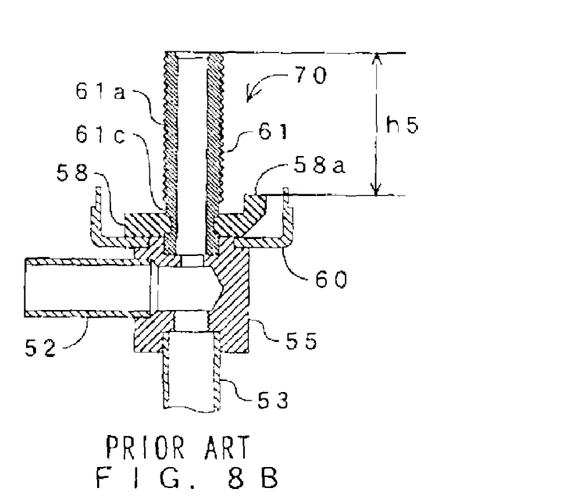
FIG. 8B is a cross-sectional view showing the state that the manufactured rotor feed screw is attached to a valve main body.

In the motor-driven valve 50, as shown in FIGS. 6 and 7B, a valve closing limit stopper 62a projects on the lower end portion of the sleeve 62, and as shown in FIGS. 6 and 8B, a full-closed stopper 58a projects on a flange body 58, and when the needle valve 57 is closed, the valve closing limit stopper 62a abuts the full-closed stopper 58a as shown in FIG. 6, which restricts the rotor 64 from further lowering at the closed state of the valve 50.

At the restriction of the rotor 64 from lowering, the distance h4 shown in FIG. 7B between the lower end of a bushing 68 and the lower end of the valve closing limit stopper 62a is set to be integer times as the pitches of a female screw 68a, and the distance h5 shown in FIG. 8B between the upper end of the male screw pipe 61 and the upper end of the full-closed stopper 58a is set to be integer times as the pitches of a male screw 61a plus a half pitch, and abutment quantity between the valve closing limit stopper 62a and the full-closed stopper 58a is adjusted to be a half pitch.

Figure 7C:
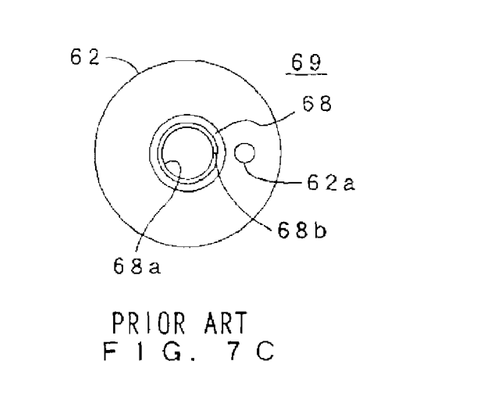
FIG. 7C is a bottom view of the rotor shown in FIG. 7B.

When manufacturing a rotor core 69, which is integrally incorporated with the sleeve 62 and the bushing 68 as shown in FIG. 6, and is arranged in the central portion of the rotor 64 of the motor-driven valve 50 described above, as shown in FIGS. 7A to 7C, an openable/closable die device 71 defining a molding recess 73 for the sleeve 62 was conventionally used. A lower die 72 of the die device 71 is provided with a molding recess 72a for the valve closing limit stopper 62a, and a pin attaching hole 72c that opens in the central portion of the molding recess 73, and is provided with a key ridge 72b on the inner circumference thereof, and to the pin attaching hole 72c of the lower die 72 is set a set pin 74 to which a bushing 68 is screwed and secured through the engagement of the key ridge 72b with a key groove 74a, which is formed on a lower end circumference of the set pin 74, such that the state shown in FIG. 7C is obtained after the sleeve 62 is molded (such that a thread-cut leading end 68b of the female screw 68a of the bushing 68 is positionally aligned with the molding recess 72a for the valve closing limit stopper 62a), the prescribed distance h4 that is integer times as the pitches of the female screw 68a is maintained between a pin stepped portion 74b, to which a bottom face 68c of the bushing 68 abuts, and an inner bottom face of the stopper molding recess 72a, and then the die device 71 is closed. Then, molten resin is cast into the molding recess 73 so as to form the rotor core 69 as shown in FIGS. 7B and 7C, in which the bushing 68 and the sleeve 62 are integrally incorporated.

Figure 8C:
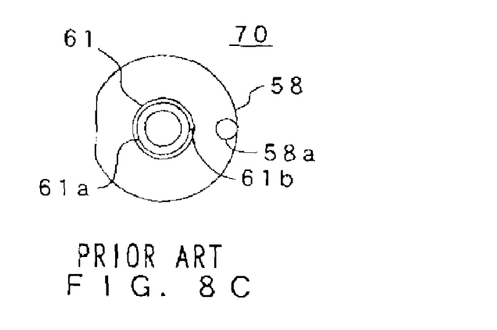
FIG. 8C is a top view of the rotor feed screw shown in FIG. 8B.

In addition, as to a rotor feed screw 70 also, in the same manner as described above and shown in FIGS. 8A to 8C, a die device 80 defining a molding recess 82 for the flange body 58 was used. A lower mold 81 of the die device 80 is provided with a molding recess 81a for the full-closed stopper 58a, and a bushing attaching hole 81c that opens in the central portion of the molding recess 82 and has a key ridge 81b at an inner bottom face, and to the bushing attaching hole 81c of the lower mold 81 is set a cylindrical set bushing 83 with a bottom to which a male screw pipe 61 is screwed and secured, as shown in FIG. 8A through the engagement of the key ridge 81b with a key groove 83a, which is formed on the lower portion of the set bushing 83, such that a thread-cut leading end 61b of the male screw 61a is positionally aligned with the stopper molding recess 81a, and a base end attaching portion 61c of the male screw pipe 61 projects above the lower mold 81. Then, the die device 80 is closed, and molten resin is cast into the molding recess 82 so as to form the rotor feed screw 70 as shown in FIGS. 8B and 8C, in which the male screw pipe 61 and the flange body 58 are integrally incorporated.

As mentioned above, conventionally, in order to manufacture the rotor core 69 and the rotor feed screw 70, the set pin 74 and the set bushing 83 were prepared, and these were incorporated with the bushing 68 and the male screw pipe 61, and then molten resin was required to be cast with the die device 71 and the die device 80, so that it took much time to manufacture the rotor core 69 and the rotor feed screw 70, resulting in increased manufacturing cost of the motor-driven valve 50.

SUMMARY OF THE INVENTION

The present invention has been made in consideration of the above problems of the prior art, and the object thereof is to improve manufacturing processes of the rotor core for the motor-driven valve, the rotor feed screw, and the rotor, and to provide methods of manufacturing them with decreased manufacturing cost.

To achieve the above object, the present invention relates to a method of manufacturing a rotor core for a motor-driven valve that is arranged in a central portion of a rotor of the motor-driven valve having a valve body linearly moving by rotation of the rotor of an electric motor, the rotor core composed of: a cylindrical sleeve entirely formed of synthetic resin with a valve closing limit stopper for restricting, in a fully-closed state of the valve, the rotor from further moving in a direction that the valve closes; and a bushing with a female screw on an internal circumference thereof and integrally fixed on an internal circumference of the sleeve, the method comprising the steps of: using an openable/closable die device defining a molding recess for the sleeve; forming to the die device a molding recess for the valve closing limit stopper and a first positioning portion positionally corresponding to the molding recess; forming to the bushing a second positioning portion such that when the second positioning portion coincides with the first positioning portion a thread-cut leading end of the female screw and the molding recess for the valve closing limit stopper are positionally corresponding to each other; mounting the bushing to the die device such that the second positioning portion coincides with the first positioning portion; and closing the die device and casting molten resin into the molding recess to manufacture the rotor core for the motor-driven valve.

With the present invention, since to the bushing is simultaneously formed the thread-cut leading end of the female screw and the second positioning portion positionally corresponding to the thread-cut leading end, and after the bushing is mounted to the die device such that the first positioning portion of the die device and the second positioning portion coincide with each other the die device is closed and molten resin is cast into the molding recess to manufacture the rotor core, it is unnecessary to use a set pin like in conventional methods, and the rotor core may be manufactured with ease through resin molding with the bushing and the die device only.

In the above method of manufacturing the rotor core, the first positioning portion may be one of a projecting portion and a stepped portion, and the second positioning portion can be one of a key groove fitted to the projecting portion and a letter D shaped notch, observed in an axial direction of the rotor core, abutting the stepped portion. With this, the first and second positioning portions may easily be formed.

Further, the present invention relates to a method of manufacturing a rotor feed screw for a motor-driven valve that engages with a rotor of the motor-driven valve having a valve body linearly moving by rotation of the rotor of an electric motor, the rotor feed screw composed of: a male screw pipe having a male screw on an external circumference thereof and an attaching portion to a valve main body at an end portion thereof; and a flange body with a valve closing limit stopper for restricting, in a fully-closed state of the valve, the rotor from further moving in a direction that the valve closes, the flange body made of synthetic resin integrally fixed on an external circumference of the male screw pipe, the method comprising the steps of: using an openable/closable die device defining a molding recess for the flange body; forming to the die device a molding recess for the valve closing limit stopper and a first positioning portion positionally corresponding to the molding recess; forming to the male screw pipe a second positioning portion such that when the second positioning portion coincides with the first positioning portion a thread-cut leading end of the male screw and the molding recess for the valve closing limit stopper are positionally corresponding to each other; mounting the male screw pipe to the die device such that the second positioning portion coincides with the first positioning portion; and closing the die device and casting molten resin into the molding recess to manufacture the rotor feed screw for the motor-driven valve.

With the present invention, since to the male screw pipe is simultaneously formed the thread-cut leading end of the male screw and the second positioning portion positionally corresponding to the thread-cut leading end, and after the male screw pipe is mounted to the die device such that the first positioning portion of the die device and the second positioning portion coincide with each other the die device is closed and molten resin is cast into the molding recess to manufacture the rotor feed screw, it is unnecessary to use a set bushing like in conventional methods, and the rotor feed screw may be manufactured with ease through resin molding with the male screw pipe and the die device only.

In the above method of manufacturing the rotor feed screw, the first positioning portion may be one of a projecting portion and a stepped portion, and the second positioning portion can be one of a key groove fitted to the projecting portion and a letter D shaped notch, observed in an axial direction of the rotor feed screw, abutting the stepped portion. With this, the first and second positioning portions may easily be formed.

Further, the present invention relates to a method of manufacturing a rotor for a motor-driven valve having a valve body linearly moving by rotation of the rotor of an electric motor, the rotor composed of: a rotor main body entirely formed of synthetic resin and having a valve closing limit stopper for restricting, in a fully-closed state of the valve, the rotor from further moving in a direction that the valve closes; and a bushing with a female screw on an internal circumference thereof and integrally fixed on an internal circumference of the rotor main body, the method comprising the steps of: using an openable/closable die device defining a molding recess for the rotor main body; forming to the die device a molding recess for the valve closing limit stopper and a first positioning portion positionally corresponding to the molding recess; forming to the bushing a second positioning portion such that when the second positioning portion coincides with the first positioning portion a thread-cut leading end of the female screw and the molding recess for the valve closing limit stopper are positionally corresponding to each other; mounting the bushing to the die device such that the second positioning portion coincides with the first positioning portion; and closing the die device and casting molten resin into the molding recess to manufacture the rotor for the motor-driven valve.

With the present invention, since to the bushing is simultaneously formed the thread-cut leading end of the female screw and the second positioning portion positionally corresponding to the thread-cut leading end, and after the bushing is mounted to the die device such that the first positioning portion of the die device and the second positioning portion coincide with each other the die device is closed and molten resin is cast into the molding recess to manufacture the rotor, it is unnecessary to use a set pin like in conventional methods, and the rotor may be manufactured with ease through resin molding with the bushing and the die device only.

In the above method of manufacturing the rotor, the first positioning portion may be one of a projecting portion and a stepped portion, and the second positioning portion can be one of a key groove fitted to the projecting portion and a letter D shaped notch, observed in an axial direction of the rotor, abutting the stepped portion. With this, the first and second positioning portions may easily be formed.

As described above, with the present invention, manufacturing processes of the rotor core for the motor-driven valve, the rotor feed screw, and the rotor can be simplified, and manufacturing cost of the motor-driven valve may be decreased.

BRIEF DESCRIPTION OF THE DRAWINGS

The present invention will be more apparent from the ensuring description with reference to the drawings, wherein:

FIGS. 2A to 2D are drawings showing a die device and a bushing used for the method of manufacturing a rotor core, and a rotor core made by the method of the present invention, in which

FIGS. 3A to 3D are drawings showing a die device and a male screw pipe for the method of manufacturing a rotor feed screw, and a rotor feed screw made by the method of the present invention, in which

FIGS. 4A to 4D are drawings showing a die device and a bushing for the method of manufacturing a rotor, and a rotor made by the method of the present invention, in which

FIGS. 7A to 7C are drawings for showing a rotor core of the motor-driven valve shown in FIG. 6 and for explaining a method of manufacturing the rotor core, in which FIGS. 8A to 8C are drawings for showing the rotor feed screw of the motor-driven valve shown in FIG. 6 and for explaining a method of manufacturing the rotor feed screw, in which

THE BEST MODE TO CARRY OUT THE INVENTION

Figure 1:
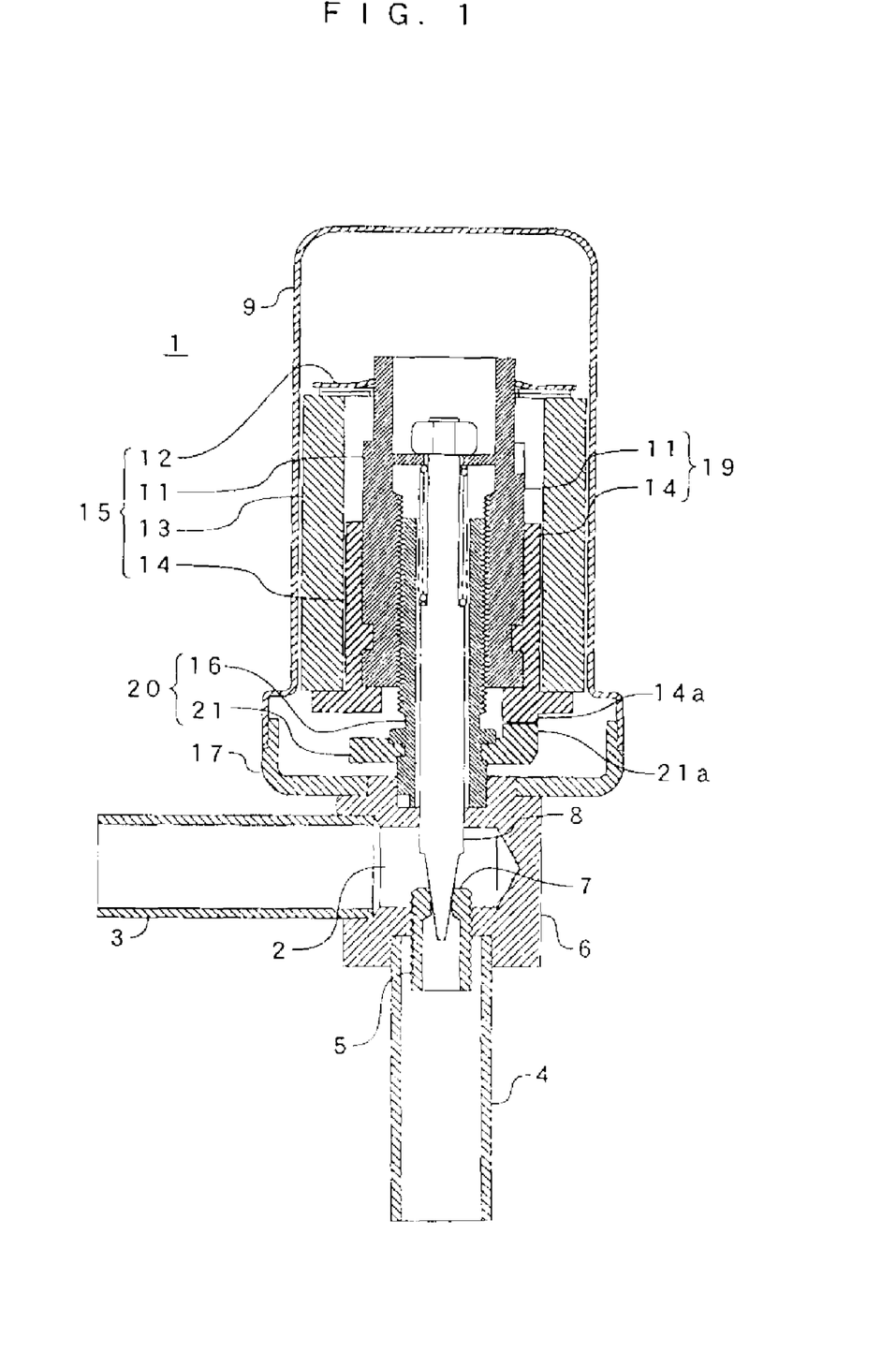
FIG. 1 is an overall cross-sectional view of a motor-driven valve in which a rotor core and rotor feed screw made by the methods of the present invention are incorporated.

FIG. 1 shows an example of a motor-driven valve to which a rotor core and a rotor feed screw made by methods of the present invention are incorporated, and this motor-driven valve 1 is provided with almost the same construction as the conventional motor-driven valve 50 described above. The motor-driven valve 1 comprises: a valve main body 6 having a first passage 3 and a second passage 4 communicating with a valve chamber 2, and a valve seat 5 at a portion of the second passage 4 communicating with the valve chamber 2; a rod-shaped needle valve 8 that contacts with and is separated from a valve seat portion 7 of the valve main body 6; a cylindrical sealed case 9; a stator coil not shown disposed outside the sealed case 9; a rotor 15 that rotates in the sealed case 9 through magnetization by feeding current of the stator coil so as to be movable in a valve opening/closing direction; and a male screw pipe 16 allowing the needle valve 8 to act for valve opening/closing operation through screw-feeding action by rotation of the rotor 15, wherein a lower case 17 of the sealed case 9 is fixed through welding to the valve main body 6. The rotor 15 has a cylindrical bushing 11, a cylindrical permanent magnet 63 fixed on an outer surface of the bushing 11 through a stop ring 12, and a cylindrical sleeve 14 disposed between the bushing 11 and the permanent magnet 13.

Figure 2A:
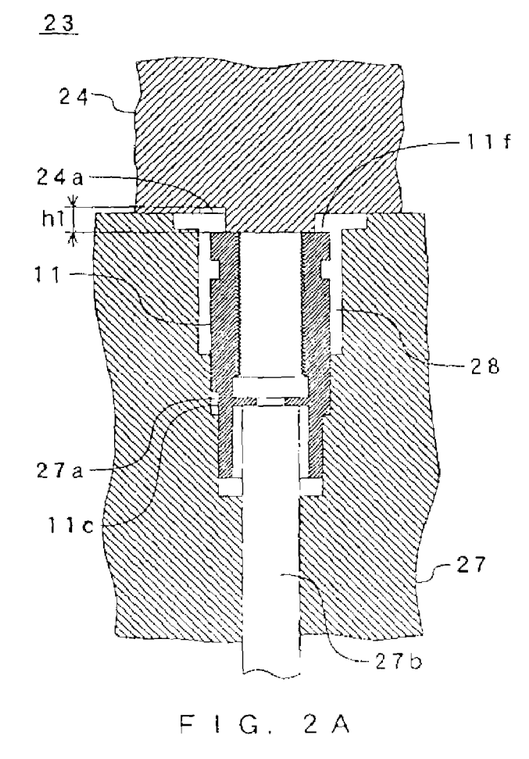
FIG. 2A is an overall cross-sectional view showing the state that the bushing is positioned to the die device.
Figure 2B:
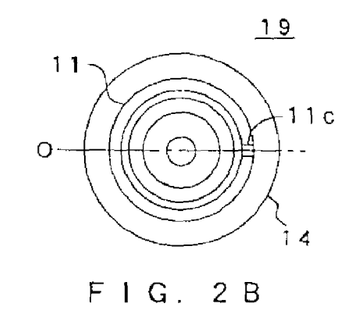
FIGS. 2B to 2D are a top view, an overall cross-sectional view, and a bottom view of the rotor core after a sleeve is formed.
Figure 2C:
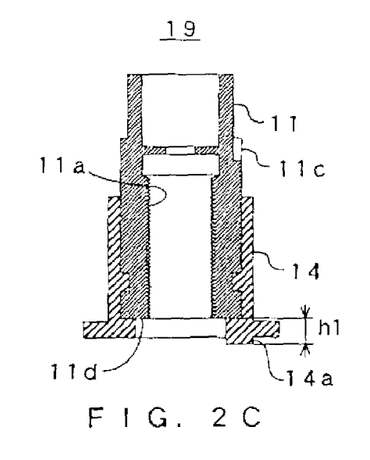
Figure 3A:
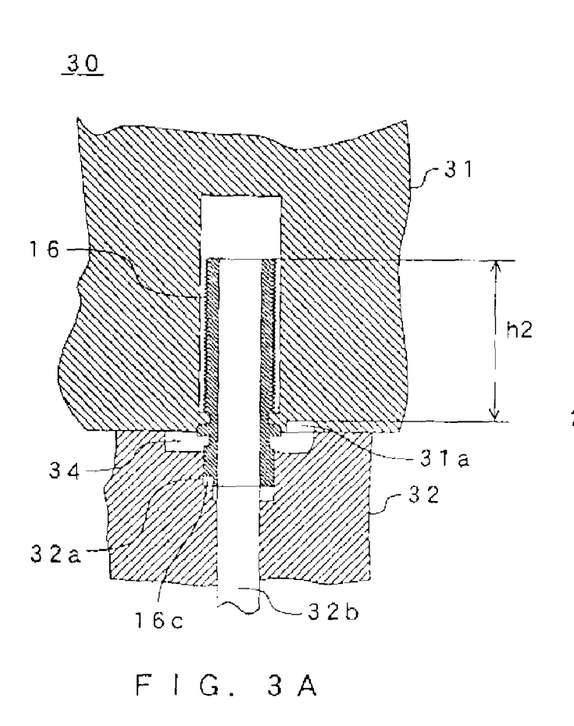
FIG. 3A is an overall cross-sectional view showing the state that the male screw pipe is positioned to the die device.
Figure 3B:
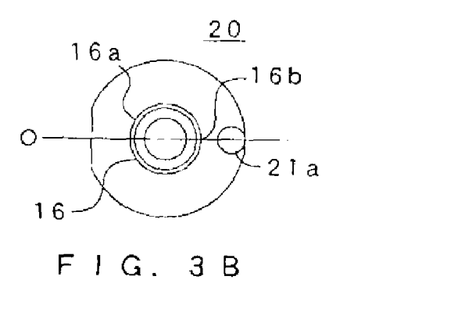
FIGS. 3B to 3D are a top view, an overall cross-sectional view, and a bottom view of the rotor feed screw after a flange body is formed.
Figure 3C:
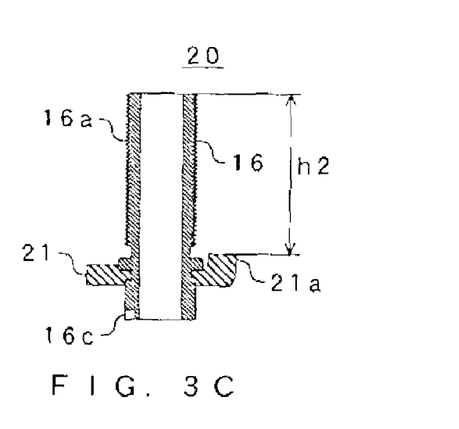

In the motor-driven valve 1 is, as shown in FIG. 1 and FIG. 2C, a valve closing limit stopper 14a projects on a lower end portion of the sleeve 14, and as illustrated in FIG. 1 and FIG. 3C, a full-closed stopper 21a projects on a flange body 21 integrally formed to the male screw pipe 16. When the needle valve 8 closes, the valve closing limit stopper 14a abuts the full-closed stopper 21a as shown in FIG. 1, which restricts the rotor 15 from further lowering in the closed state of the valve.

When restricting the rotor 15 from lowering, for instance, a distance h1 between a bottom face 11d of the bushing 11 and the lower end of the valve closing limit stopper 14a shown in FIG. 2C is set to be integer times as the pitches of a female screw 11a, and the distance h2 shown in FIG. 3B between the upper end of the male screw pipe 16 and the upper end of the full-closed stopper 21a is set to be integer times as the pitches of a male screw 16a plus a half pitch, and abutment quantity between the valve closing limit stopper 14a and the full-closed stopper 21a is adjusted to be a half pitch.

Next, a method of manufacturing the rotor core 19 of the motor-driven valve 1 will be explained with reference to FIG. 1 and FIGS. 2A to 2D.

Figure 2D:
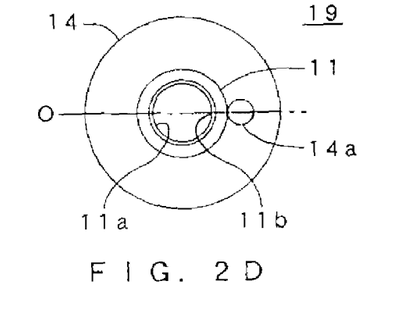

FIG. 2A shows a die device 23 for manufacturing the rotor core 19, and FIGS. 2B to 2D show the rotor core 19 manufactured by using the die device 23. This die device 23 is provided with an upper die 24 and a lower die 27 with a mounting portion 27b to which the bushing 11 is mounted, and the die device 23 forms a molding recess 28 for the sleeve 14 and a stopper molding recess 24a for the valve closing limit stopper 14a. In addition, on the lower die 27 is formed a key ridge 27a which engages with a key groove 11c of the bushing 11. Further, the position of a ceiling of the stopper molding recess 24a is set in such a manner that the distance from an upper face 11f of the bushing 11 becomes h1.

Next, a method of manufacturing the bushing 11, and methods of setting the positions of the key ridge 27a formed on the lower die 27 and the stopper molding recess 24a formed on the upper die 24 will be explained.

As shown in FIGS. 2C and 2D, it is necessary that in the state that the rotor core 19 is completed, not only the thread-cut leading end 11b of the female screw 11a of the bushing 11 and the center of the valve closing limit stopper 14a are aliened on the straight line O, but also in this state, the distance between the bottom face 11d of the bushing 11 and the lower end of the valve closing limit stopper 14a of the sleeve 14 becomes h1.

Therefore, on the bushing 11, the key groove 11c engaging with the key ridge 27a that is formed on the lower die 27 of the die device 23 is formed, and at the same time, the thread-cut leading end 11b of the female screw 11a is threaded so as to be positionally corresponding to the key groove 11c. Here, as shown in FIGS. 2B to 2D, the threading is performed such that the center line of the key groove 11c and the thread-cut leading end 11b are aliened on the straight line O.

On the other hand, as to the upper die 24, the position of the stopper molding recess 24a is set such that after forming the sleeve 14 the rotor core 19 becomes in the states shown in FIGS. 2B to 2D. In other words, as described above, in case that threading is carried out to the bushing 11 such that the center line of the key groove 11c and the thread-cut leading end 11b are aliened on the straight line O, when the die device 23 shown in FIG. 2A is observed from the top thereof, the center line of the stopper molding recess 24a of the upper die 24 and the center of the stopper molding recess 24a overlap with each other.

With the bushing 11 manufactured as stated above and the die device 23, the bushing 11 is mounted on the mounting portion 27b of the lower die 27 in such a manner that the key groove 11c of the bushing 11 engages with the key ridge 27a; the die device 23 is closed; and molten resin is cast into the molding recess 28 to manufacture the rotor core 19 in which the bushing 11 and the sleeve 14 are integrally incorporated as shown in FIGS. 2B to 2D.

Next, a method of manufacturing the rotor feed screw 20 of the motor-driven valve 1 will be explained with reference to FIG. 1 and FIGS. 3A to 3D.

Figure 3D:
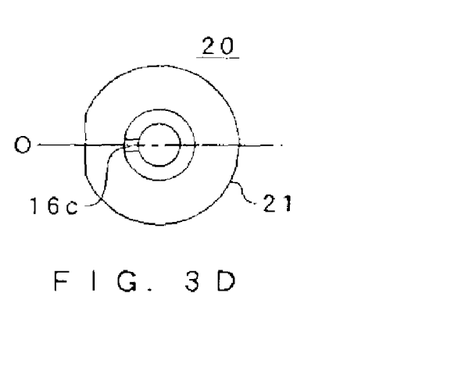

FIG. 3A shows a die device 30 for manufacturing the rotor feed screw 20, and FIGS. 3B to 3D show the rotor feed screw 20 manufactured by using the die device 30. This die device 30 is provided with an upper die 31 and a lower die 32 with a mounting portion 32b to which the male screw pipe 16 is mounted, and the die device 30 forms a molding recess 34 for the flange body 21 shown in FIG. 3C and a stopper molding recess 31a for the full-closed stopper 21a. In addition, on the lower die 32 is formed a key ridge 32a which engages with a key groove 16c of the male screw pipe 16. Further, the position of a ceiling of the stopper molding recess 31a is set in such a manner that the distance from the top of the male screw pipe 16 becomes h2 when the male screw pipe 16 is mounted on the mounting portion 32b of the lower die 32.

Next, a method of manufacturing the male screw pipe 16, and methods of setting the positions of the key ridge 32a formed on the lower die 32 and the stopper molding recess 31a on the upper die 31 will be explained.

As shown in FIGS. 3B and 3C, it is necessary that in the state that the rotor feed screw 20 is completed, not only the thread-cut leading end 16b of the male screw 16a of the male screw pipe 16 and the center of the full-closed stopper 21a are aliened on the straight line O, but also in this state, the distance between the upper end of the male screw pipe 16 and the upper end of the full-closed stopper 21a of the flange body 21 becomes h2.

Therefore, to the male screw pipe 16, the key groove 16c engaging with the key ridge 32a that is formed on the lower die 32 of the die device 30 is formed, and at the same time, the thread-cut leading end 16b of the male screw 16a is threaded so as to be positionally corresponding to the key groove 16c. Here, as shown in FIGS. 3B to 3D, the threading is performed such that the center line of the key groove 16c and the thread-cut leading end 16b are aliened on the straight line O.

On the other hand, as to the die device 30, the positions of the key ridge 32a and the stopper molding recess 31a are set such that after forming the flange body 21 the rotor feed screw 20 is in the states shown in FIGS. 3B to 3D. In other words, as described above, in case that threading is carried out to the male screw pipe 16 such that the center line of the key groove 16c and the thread-cut leading end 16b are aliened on the straight line O, when the die device 30 shown in FIG. 3A is observed from the top thereof, the center line of the key ridge 32a of the lower die 32 and the center of the stopper molding recess 31a overlap with each other.

With the male screw pipe 16 manufactured as stated above and the die device 30, the male screw pipe 16 is mounted on the mounting portion 32b of the lower die 32 in such a manner that the key groove 16c of the male screw pipe 16 engages with the key ridge 32a; the die device 30 is closed; and molten resin is cast into the molding recess 34 to manufacture the rotor feed screw 20 in which the male screw pipe 16 and the flange body 21 are integrally incorporated as shown in FIGS. 3B to 3D.

Next, as another embodiment of the present invention, a method of manufacturing a rotor of a motor-driven valve will be explained with reference to FIGS. 4A to 4D. The rotor 40 manufactured in this embodiment is an assembly in which a cylindrical rotor main body 41 having a valve closing limit stopper 41a and entirely formed of resin material to which magnet powder is mixed, and the bushing 11 used at the manufacture of the rotor core 19. And, the overall shape of the rotor main body 41 corresponds to the shape of the permanent magnet 13 and the sleeve 14 shown in FIG. 1 is incorporated.

Figure 4A:
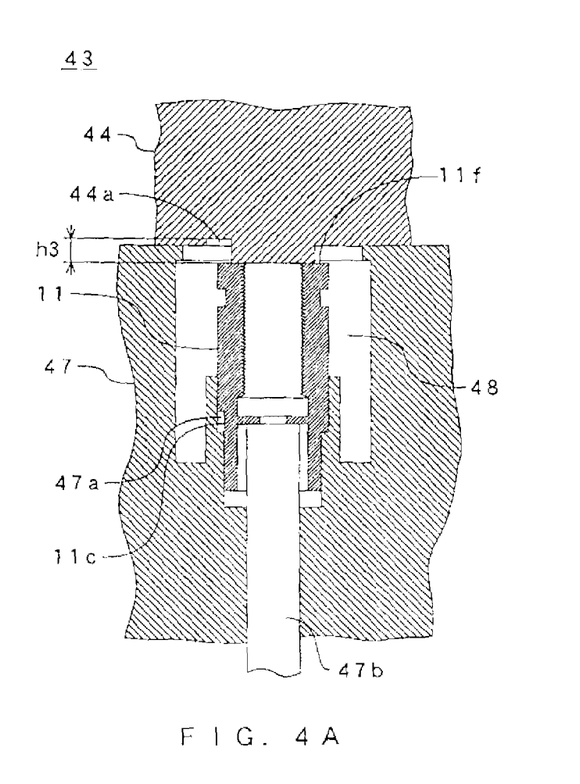
FIG. 4A is an overall cross-sectional view showing the state that the bushing is positioned to the die device.
Figure 4B:
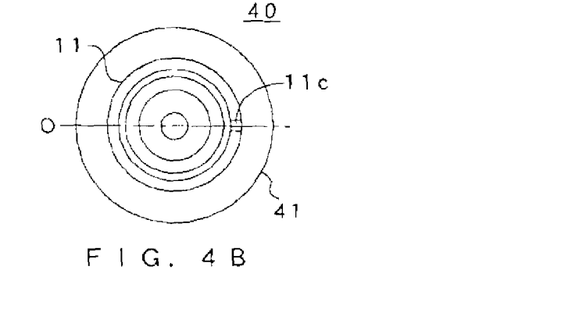
FIGS. 4B to 4D are a top view, an overall cross-sectional view, and a bottom view of the rotor after a rotor main body is formed.
Figure 4C:
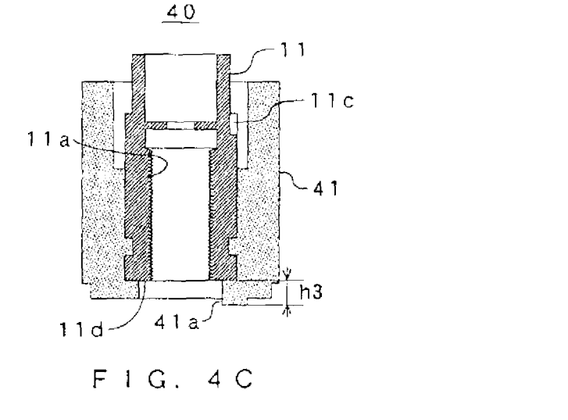
Figure 4D:
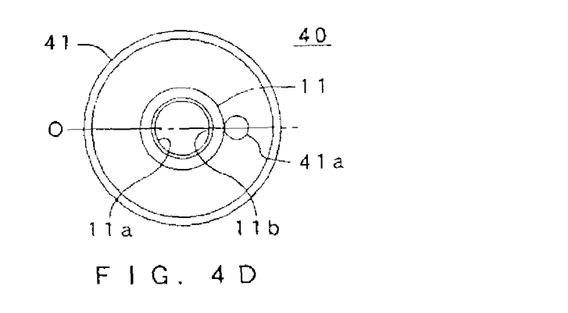

FIG. 4A shows a die device 43 for manufacturing a rotor according to the present invention, and FIGS. 4B to 4D show the rotor 40 manufactured by using the die device 43. This die device 43 is provided with an upper die 44 and a lower die 47 with a mounting portion 47b to which the bushing 11 is mounted, and the die device 43 forms a molding recess 48 for the rotor main body 41 and a stopper molding recess 44a for the valve closing limit stopper 41a shown in FIG. 4C. In addition, on the lower die 47 is formed a key ridge 47a which engages with a key groove 11c of the bushing 11. Further, the position of a ceiling of the stopper molding recess 44a is set in such a manner that the distance from an upper face 11f of the bushing 11 becomes h3.

Next, a method of manufacturing the bushing 11, and methods of setting the positions of the key ridge 47a formed on the lower die 47 and the stopper molding recess 44a formed on the upper die 44 will be explained.

As shown in FIGS. 4C and 4D, it is necessary that in the state that the rotor 40 is completed, not only the thread-cut leading end 11b of the female screw 11a of the bushing 11 and the center of the valve closing limit stopper 41a are aliened on the straight line O, but also in this state, the distance between the bottom face 11d of the bushing 11 and the lower end of the valve closing limit stopper 41a of the rotor main body 41 becomes h3.

Therefore, in the bushing 11, the key groove 11c engaging with the key ridge 47a that is formed on the lower die 47 of the die device 43 is formed, and at the same time, the thread-cut leading end 11b of the female screw 11a is threaded so as to be positionally corresponding to the key groove 11c. Here, as shown in FIGS. 4B to 4D, the threading is performed such that the center line of the key groove 11c and the thread-cut leading end 11b are aliened on the straight line O.

On the other hand, as to the die device 43, the positions of the key ridge 47a and the stopper molding recess 44a are set such that after forming the rotor main body 41 the rotor 40 is in the states shown in FIGS. 3B to 3D. In other words, as described above, in case that threading is carried out to the bushing 11 such that the center line of the key groove 11c and the thread-cut leading end 11b are aliened on the straight line O, when the die device 43 shown in FIG. 4A is observed from the top thereof, the center line of the key ridge 47a of the lower die 47 and the center of the stopper molding recess 44a overlap with each other.

With the bushing 11 manufactured as stated above and the die device 43, the bushing 11 is mounted on the mounting portion 47b of the upper die 44 in such a manner that the key groove 11c of the bushing 11 engages with the key ridge 47a of the lower die 47; the die device 43 is closed; and molten resin is cast into the molding recess 48 to manufacture the rotor 40 in which the bushing 11 and the rotor main body 41 are integrally incorporated as shown in FIGS. 4B to 4D.

Figure 5A:
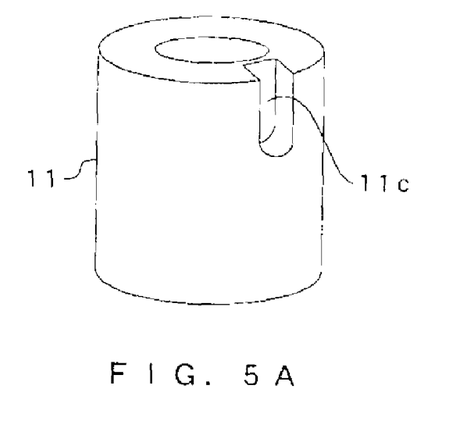
FIGS. 5A and 5B are a perspective views of a key groove and a D cut portion respectively that are used for positioning a bushing and the like to a die device in the methods of manufacturing a rotor core and the like according to the present invention.
Figure 5B:
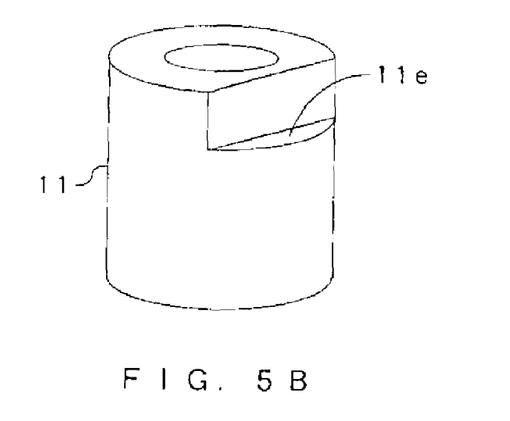

Meanwhile, although in the above embodiments, at the positioning of the bushing 11 and the like to the die devices, the key groove 11c shown in FIG. 5A is formed and is fitted to the key groove (reference number 27a in FIGS. 2A to 2D, etc.) projecting on the die device, it is possible to form a D cut portion as shown in FIG. 5B, which is a cutout portion observed in an axial direction of the bushing 11 and the like, and to allow the portion to abut a stepped portion formed on the corresponding die device, and a variety of other shapes with positioning function may be adopted.

Further, although in the above embodiments, for instance in FIGS. 2A to 2D, the center line of the key groove 11c of the bushing 11, the thread-cut leading end 11b, and the center of the valve closing limit stopper 14a are aliened on the straight line O, these positional relations may not be limited to on the straight line but other variety of relations may be adopted if the above-mentioned parts are positionally corresponding to each other in relation to the key ridge 27a of the lower die 27 or the stopper molding recess 24a of the upper die 24.

What is claimed is:

1. A method of manufacturing a rotor core for a motor-driven valve that is arranged in a central portion of a rotor of the motor-driven valve having a valve body linearly moving by rotation of the rotor of an electric motor, said rotor core composed of: a cylindrical sleeve entirely formed of synthetic resin with a valve closing limit stopper for restricting, in a fully-closed state of the valve, the rotor from further moving in a direction that the valve closes; and a bushing with a female screw on an internal circumference thereof and integrally fixed on an internal circumference of the sleeve so as to be coaxial with the sleeve, said method comprising the steps of:
using an openable/closable die device defining a molding recess for the sleeve;
forming to the die device a molding recess for the valve closing limit stopper and a first positioning portion positionally corresponding to said molding recess of the valve closing limit stopper in a rotational direction about a central axis of the sleeve that is to be formed;
forming to the bushing a second positioning portion such that when said second positioning portion coincides with the first positioning portion a thread-cut leading end of the female screw and the molding recess for the valve closing limit stopper are positionally corresponding to each other in a rotational direction about a central axis of the bushing;
mounting the bushing directly to the die device such that said second positioning portion is aligned with the first positioning portion; and
closing the die device and casting molten resin into the molding recess to manufacture the rotor core for the motor-driven valve.

2. The method of manufacturing the rotor core for the motor-driven valve as claimed in claim 1, wherein said first positioning portion is a projecting portion, and said second positioning portion is a key groove fitted to the projecting portion, abutting the stepped portion.

3. A method of manufacturing a rotor feed screw for a motor-driven valve that engages with a rotor of the motor-driven valve having a valve body linearly moving by rotation of the rotor of an electric motor, said rotor feed screw composed of: a male screw pipe having a male screw on an external circumference thereof and an attaching portion to a valve main body at an end portion thereof; and a flange body with a valve closing limit stopper for restricting, in a fully-closed state of the valve, the rotor from further moving in a direction that the valve closes, said flange body made of synthetic resin integrally fixed on an external circumference of the male screw pipe so as to be coaxial with the male screw pipe, said method comprising the steps of:
using an openable/closable die device defining a molding recess for the flange body;
forming to the die device a molding recess for the valve closing limit stopper and a first positioning portion positionally corresponding to said molding recess of the valve closing limit stopper in a rotational direction about a central axis of the male screw pipe that is to be formed;
forming to the male screw pipe a second positioning portion such that when said second positioning portion coincides with the first positioning portion a thread-cut leading end of the male screw and the molding recess for the valve closing limit stopper are positionally corresponding to each other in a rotational direction about a central axis of the male screw pipe;
mounting the male screw pipe directly to the die device such that said second positioning portion is aligned with the first positioning portion; and
closing the die device and casting molten resin into the molding recess to manufacture the rotor feed screw for the motor-driven valve.

4. The method of manufacturing the rotor feed screw for the motor-driven valve as claimed in claim 3, wherein said first positioning portion is a projecting portion, and said second positioning portion is a key groove fitted to the projecting portion, abutting the stepped portion.

5. A method of manufacturing a rotor for a motor-driven valve having a valve body linearly moving by rotation of the rotor of an electric motor, said rotor composed of: a rotor main body entirely formed of synthetic resin and having a valve closing limit stopper for restricting, in a fully-closed state of the valve, the rotor from further moving in a direction that the valve closes; and a bushing with a female screw on an internal circumference thereof and integrally fixed on an internal circumference of the rotor main body so as to be coaxial with the rotor main body, said method comprising the steps of:
using an openable/closable die device defining a molding recess for the rotor main body;
forming to the die device a molding recess for the valve closing limit stopper and a first positioning portion positionally corresponding to said molding recess of the valve closing limit stopper in a rotational direction about a central axis of the rotor main body that is to be formed;
forming to the bushing a second positioning portion such that when said second positioning portion coincides with the first positioning portion a thread-cut leading end of the female screw and the molding recess for the valve closing limit stopper are positionally corresponding to each other in a rotational direction about a central axis of the bushing;
mounting the bushing directly to the die device such that said second positioning portion is aligned with the first positioning portion; and
closing the die device and casting molten resin into the molding recess to manufacture the rotor for the motor-driven valve.

6. The method of manufacturing the rotor for the motor-driven valve as claimed in claim 5, wherein said first positioning portion is a projecting portion, and said second positioning portion is a key groove fitted to the projecting portion, abutting the stepped portion.

7. The method of manufacturing the rotor core for the motor-driven valve as claimed in claim 1, wherein said first positioning portion is a stepped portion, and said second positioning portion is a letter D shaped notch, observed in an axial direction of the rotor core, abutting the stepped portion.

8. The method of manufacturing the rotor feed screw for the motor-driven valve as claimed in claim 3, wherein said first positioning portion is a stepped portion, and said second positioning portion is a letter D shaped notch, observed in an axial direction of the rotor core, abutting the stepped portion.

9. The method of manufacturing the rotor for the motor-driven valve as claimed in claim 5, wherein said first positioning portion is a stepped portion, and said second positioning portion is a letter D shaped notch, observed in an axial direction of the rotor core, abutting the stepped portion.

* * * * *